May 1, 1923.
C. B. CONNELY
1,453,492
OVERLOAD CIRCUIT CONTROLLER
Filed Aug. 2, 1921
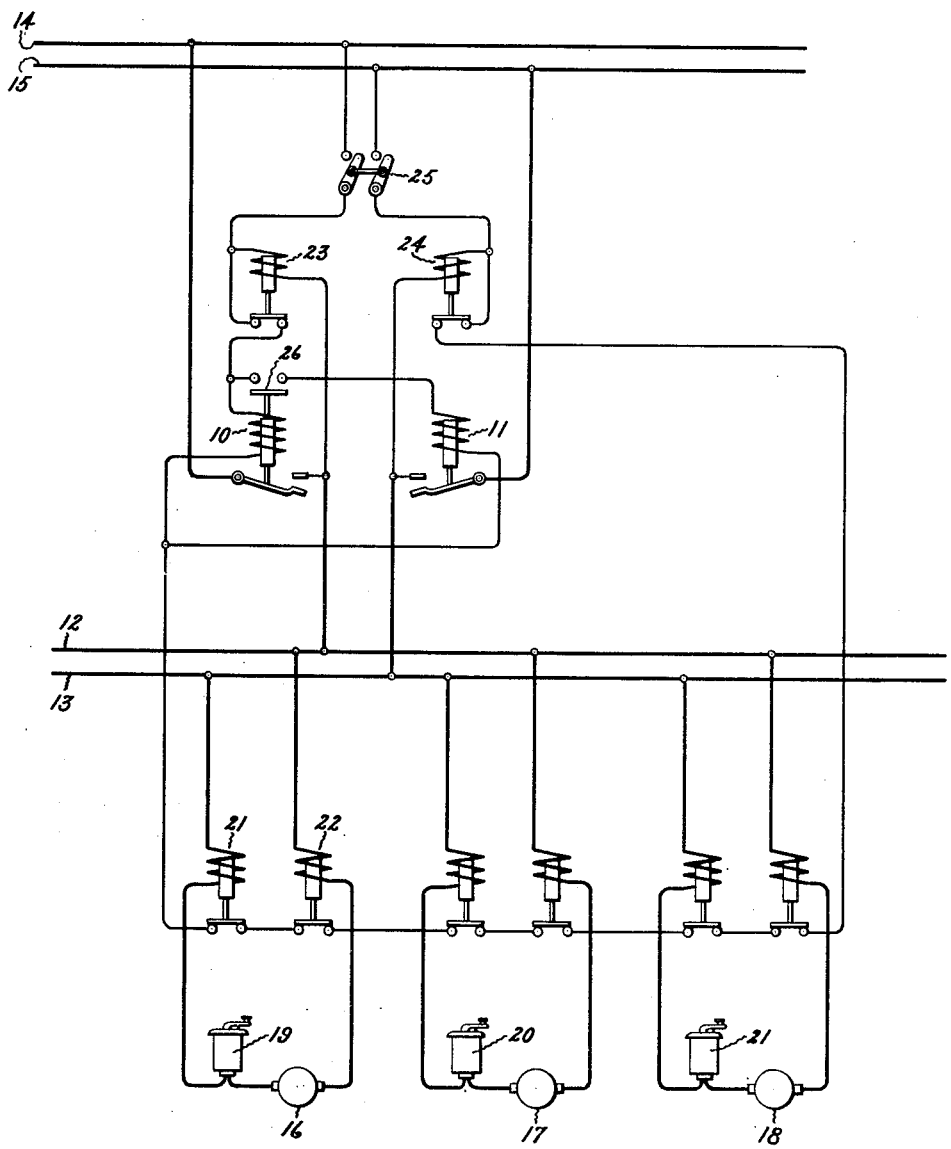
Inventor:
Charles B. Connely,
by Albert G. Davis
His Attorney.

Patented May 1, 1923.

1,453,492

UNITED STATES PATENT OFFICE.

CHARLES B. CONNELY, OF SCOTIA, NEW YORK, ASSIGNOR TO GENERAL ELECTRIC COMPANY, A CORPORATION OF NEW YORK.

OVERLOAD CIRCUIT CONTROLLER.

Application filed August 2, 1921. Serial No. 489,353.

*To all whom it may concern:*

Be it known that I, CHARLES B. CONNELY, a citizen of the United States, residing at Scotia, county of Schenectady, State of New York, have invented certain new and useful Improvements in Overload Circuit Controllers, of which the following is a specification.

My invention relates to an improved control arrangement for protecting electric circuits and the translating devices therein from overloads. Although not necessarily limited thereto, the invention has a particular application in the protection of electric motors and the electric motor circuits from overloads. One of the objects of the invention is to provide an improved arrangement whereby when an overload occurs in the controlled electric circuit, the circuit is automatically opened and cannot be reclosed until the operator does a definite act. As applied to the control of an electric motor, a motor controller is provided for starting, stopping and generally controlling the motor. The arrangement is such that the controller must be returned to the off position after the occurrence of an overload before the motor can be connected to the source of supply. Also the arrangement may be such that in case the overload on the motor is reduced to a predetermined value, the motor will be automatically reconnected to the source of supply with the motor controller in an operative position.

In carrying the invention into effect in one form, I provide an electromagnetic line switch mechanism for controlling the circuit to be controlled. Current responsive means is provided for automatically deenergizing the line switch mechanism to permit the same to open and thereby disconnect the controlled circuit from the source of supply. An electromagnetic relay mechanism energized by the voltage drop across the circuit making contacts of the line switch is provided for maintaining the winding circuit of the electromagnetic line switch mechanism open until the controller has been returned to the off position. The relay mechanism may be set to automatically close and energize the line switch mechanism to close when the voltage drop across the said contacts is less than a predetermined value.

For a better understanding of the invention, reference is had to the accompanying drawing wherein I have shown an embodiment of my invention for purposes of illustration, and in which the electromagnetic switch mechanism for controlling the circuit to be controlled comprises the electromagnetic line switches 10 and 11. These line switches are adapted to connect the bus bars 12 and 13 included in the controlled circuit to the source of supply 14—15. The controlled circuit has connected thereto a plurality of translating devices, in this case the electric motors 16, 17 and 18, which are adapted to be connected in multiple to the bus bars 12 and 13 by means of the motor controllers 19, 20 and 21 respectively. The electric motor 16 is protected from overload by means of the overload relays 21 and 22 which are adapted to operate responsively to the current taken by the motor 16 to thereby open their contacts and thus deenergize the winding circuits of the electromagnetic line switches 10 and 11. The electric motors 17 and 18 are similarly protected by overload relays, as shown.

The electromagnetic relays 23 and 24 are adapted to also control the winding circuits of the line switches 10 and 11. When the pilot switch 25 is closed, the relay 23 has its winding connected across the circuit making contacts of the line switch 10, and the relay 24 has its winding connected across the contacts of the line switch 11. The arrangement is such that when any one of the current responsive overload relays operates, the electromagnetic line switches 10 and 11 will be deenergized and thereby open the circuit to the bus bars 12 and 13 and thus deenergize all of the electric motors. The opening of the line switch 10 energizes the electromagnetic relay 23 to pick up its contact, and the opening of the electromagnetic line switch 11 causes the relay 24 to be energized to open its contacts. The relays 23 and 24 will be maintained open until all of the controllers 19, 20 and 21 have been returned to their respective off positions, thereby preventing the automatic reclosure of the controlled circuits until the operator has done a definite act to protect the electric motors preparatory to again connecting the motors to the source of supply.

As thus constructed and arranged, the operation of my invention is as follows:—It is assumed that the motor controllers 19, 20 and 21 are in their respective off positions, and that the various parts are in their respective positions shown in the drawing. In order to start any one or all of the motors, the pilot switch 25 is first closed, thereby energizing the electromagnetic line switch 10 to close its contacts, the circuit for the winding of the line switch 10 being from the supply conductor 14, through the pilot switch 25, through the contacts of the relay 23, winding of the line switch 10, through the contacts of the various overload protective relays, the contacts of the relay 24, to the other supply conductor 15. The line switch 10 in closing completes the circuit for the winding of the line switch 11 at the contacts of the auxiliary switch 26. The line switch 11 will thereby be energized to close and connect the bus bars 12 and 13 to the source of supply. The motor controllers 19, 20 and 21 may thereupon be operated to energize their respective controlled motors.

Assume that an overload occurs in the circuit of the electric motor 16,—the overload relays 21 and 22 will be energized to open their respective contacts and thereby denergize the line switches 10 and 11. As soon as the line switches 10 and 11 open, the overload relays 21 and 22 will return to their normally closed position, but the relays 23 and 24 will be energized to open their respective contacts and thereby maintain the winding circuits of the line switches open until the motor controllers 19, 20 and 21 have been returned to their respective off positions. The circuit for the winding of the relay 23, is from the supply conductor 14, through the master switch 25, winding of relay 23, to the bus bar 12, and from the bus bar 12 through the motor circuit, through the bus bar 13, from the bus bar 13 through the winding of the relay 24, to the supply conductor 15. In order to reconnect the electric motors to the source of supply, it is necessary to first return all of the controllers 19, 20 and 21 to their respective off positions, thereby deenergizing the relays 23 and 24. If an overload has occurred on the circuit of the electric motor 16, the controllers 20 and 21 may now be operated to energize their respective control motors from the bus bars 12 and 13. If, for example, the overload in the electric motor 16 has been caused by a short circuited winding, when this motor is again connected to the bus bars 12 and 13 by the operation of the controller 19, the line switches 10 and 11 will be automatically opened and maintained open until all the motor controllers have been returned to their respective off positions. In this manner the defective circuit is easily located, so that the line switches 10 and 11 are operable to protect all of the controlled motors, and the motors which it is safe to operate may be operated while the dangerous condition in the one motor circuit is being remedied.

The above explanation has been made with the understanding that the circuit through the relays 23 and 24 must be opened before the electromagnetic line switches can be closed. However, it will be understood by those skilled in the art that the relays can be set to automatically close at any predetermined voltage drop across the contacts of the line contactors. Thus if the controlled motors are shunt or compound wound and the generated potential of the motors is maintained above a predetermined value for a predetermined time interval after the occurrence of an overload, due to the removal of the cause of the overload, the relays will permit the automatic reclosing of the line switches at a value of voltage drop across the contacts of the line switches determined by the setting of the relays.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. The combination with an electric circuit of an electromagnetic switch biased to the open position for controlling the same, current responsive means for controlling the winding of the said switch, a normally closed electromagnetic relay having its winding connected across the circuit making contacts of the said switch for controlling the switch winding, and connections whereby upon an overload in the said circuit the current responsive means operates to deenergize the line switch and said relay is energized to maintain the winding of the said switch open until the voltage drop across the said contacts is reduced to a predetermined value.

2. The combination with an electric circuit of an electromagnetic switch biased to the open position for controlling the same, current responsive means for controlling the winding of the said switch, a normally closed electromagnetic relay having its winding connected across the circuit making contacts of the said switch for controlling the switch winding, a controller for the said circuit, and connections whereby upon an overload in the said circuit the current responsive means operates to deenergize the line switch and said relay is energized to maintain the winding circuit of the said switch open until the said controller is returned to the off position.

3. The combination with an electric circuit, of an electromagnetic switch biased to the open position for controlling the same, a plurality of translating devices connected to the electric circuit controlled by the said switch, means responsive to the current in the circuits of the said translating devices for controlling the winding of the said switch, a normally closed electromagnetic relay having its winding connected across the circuit making contacts of the said switch for controlling the switch winding, a controller for each of said translating devices, and connections whereby upon an overload in the circuit of any one of said translating devices, the current responsive means operates to deenergize the line switch and said relay is energized to maintain the winding circuit of said switch open until all of the said controllers are returned to the off position.

4. The combination with an electric circuit, of an electromagnetic switch biased to the open position in each conductor of the said circuit for controlling the circuit, current responsive means for controlling the winding of the said switch, a plurality of normally closed electromagnetic relays each having its winding connected across the circuit making contacts of a corresponding switch for controlling the switch windings, a controller for the said circuit, and connections whereby upon an overload in the said circuit, the current responsive means operates to deenergize the line switches and the said relays are energized to maintain the winding circuits of the said switches open until the said controller is returned to the off position.

5. The combination with an electric circuit, of a plurality of electromagnetic switches biased to the open position for controlling the same, a plurality of translating devices connected to the electric circuits to receive energy therefrom, a current limit relay included in the circuit of each of said translating devices, a plurality of normally closed electromagnetic relays each having its winding connected across the circuit making contacts of a corresponding one of said switches for controlling the switch windings, a controller for the circuit of each of said translating devices, and connections whereby upon an overload in the circuit of any one of said translating devices, the corresponding current limit relay operates to deenergize the said line switches, and the said normally closed relays are energized to maintain the winding circuits of the said line switches open until all of the said controllers are returned to the off position.

In witness whereof, I have hereunto set my hand this first day of August, 1921.

CHARLES B. CONNELY.